United States Patent [19]
Walker et al.

[11] Patent Number: 5,770,119
[45] Date of Patent: *Jun. 23, 1998

[54] LASER DEMOLDING METHOD

[75] Inventors: Craig William Walker; Henri Armand Dagobert, both of Jacksonville, Fla.

[73] Assignee: Johnson & Johnson Vision Products, Inc., Jacksonville, Fla.

[ * ] Notice: The term of this patent shall not extend beyond the expiration date of Pat. No. 5,294,379.

[21] Appl. No.: 631,725

[22] Filed: Apr. 10, 1996

Related U.S. Application Data

[60] Continuation of Ser. No. 464,244, Jun. 5, 1995, abandoned, which is a division of Ser. No. 257,801, Jun. 10, 1994, abandoned, Continuation-in-part of Ser. No. 207,443, Mar. 7, 1994, Pat. No. 5,417,557, which is a division of Ser. No. 947,218, Sep. 18, 1992, Pat. No. 5,294,379.

[51] Int. Cl.$^6$ ...................................................... B29D 11/00
[52] U.S. Cl. ........................ 264/1.37; 264/1.1; 264/334; 264/402; 425/808
[58] Field of Search ................................ 264/1.36, 1.37, 264/1.38, 1.1, 334, 402; 425/808

[56] References Cited

U.S. PATENT DOCUMENTS

| | | | |
|---|---|---|---|
| 5,080,839 | 1/1992 | Kindt-Larsen | 264/1.7 |
| 5,294,379 | 3/1994 | Ross et al. | 264/1.36 |
| 5,326,505 | 7/1994 | Adams et al. | 264/1.36 |
| 5,417,557 | 5/1995 | Ross et al. | 425/808 |

FOREIGN PATENT DOCUMENTS

| | | | |
|---|---|---|---|
| 528664 | 2/1993 | European Pat. Off. | 264/1.1 |
| 60-192606 | 10/1985 | Japan | 264/334 |
| 61-78613 | 4/1986 | Japan | 264/334 |
| 61-283509 | 12/1986 | Japan . | |
| 4-59314 | 2/1992 | Japan | 264/334 |

*Primary Examiner*—Mathieu D. Vargot

[57] ABSTRACT

An automated demolding apparatus for reliably and repeatedly mechanically separating contact lens mold portions of a mold assembly without damaging the contact lens formed there between. Before demolding, the second mold portion is irradiated by a laser beam, which is absorbed thereby to cause a substantial temperature gradient between the second mold portion and the contact lens being demolded.

12 Claims, 8 Drawing Sheets

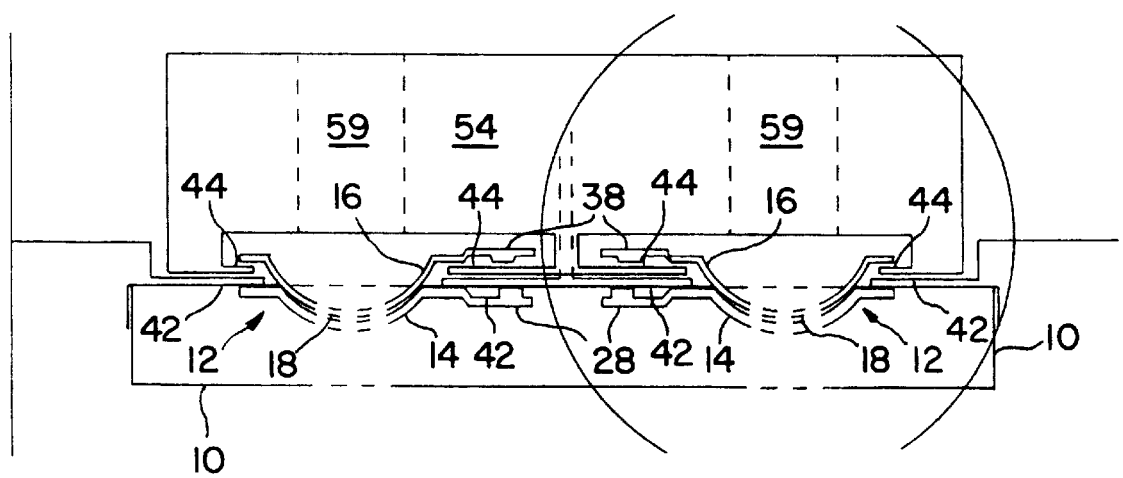
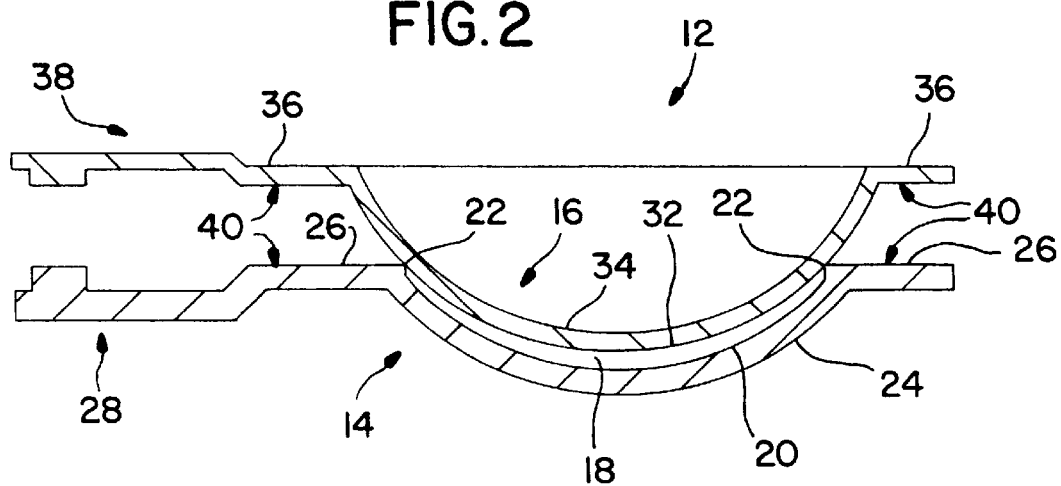

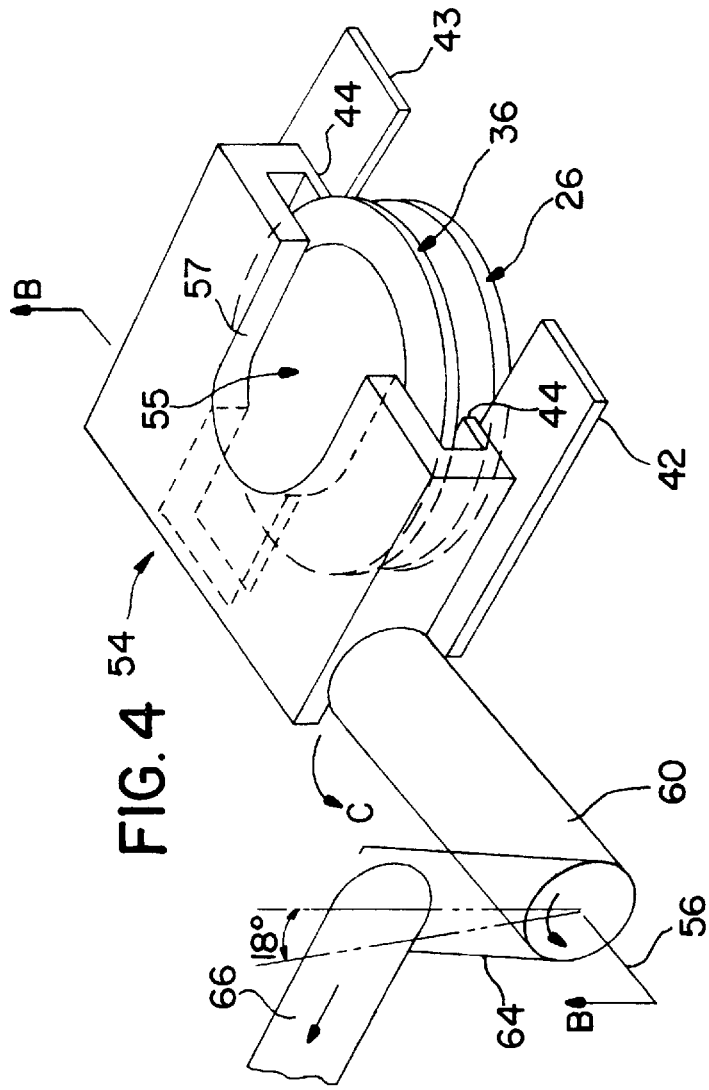

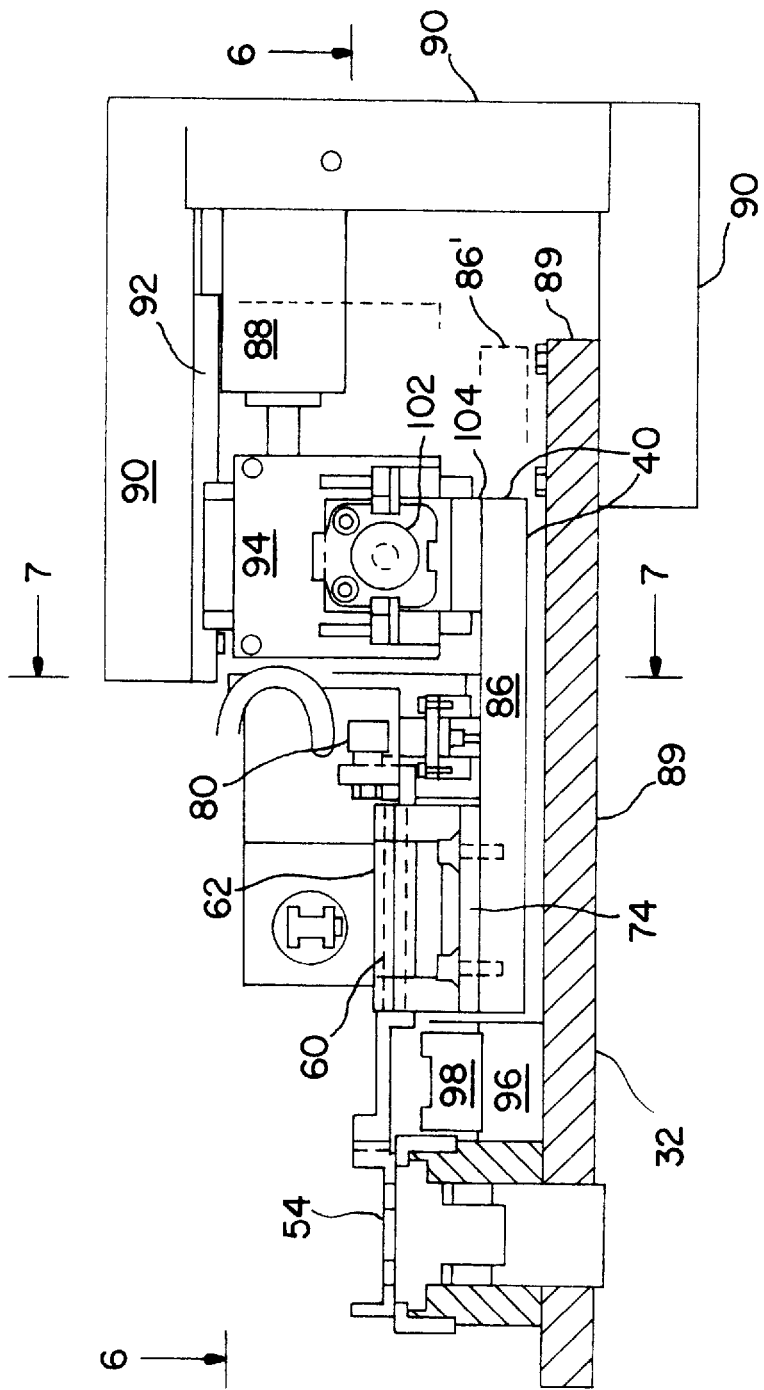

LASER DEMOLDING METHOD

CROSS REFERENCE TO RELATED APPLICATIONS

This application is a Continuation of U.S. Ser. No. 08/464,244, entitled LASER DEMOLDING APPARATUS AND METHOD, filed Jun. 5, 1995, now abandoned, which is a Divisional of U.S. Ser. No. 08/257,801, also entitled LASER DEMOLDING APPARATUS AND METHOD, filed Jun. 10, 1994, now abandoned, which is a Continuation-in-Part of U.S. Ser. No. 207,443, filed Mar. 7, 1994, entitled LASER ASSISTED DEMOLDING OF OPTHALMIC LENSES now U.S. Pat. No. 5,417,557, which is a Divisional of U.S. Ser. No. 947,218 entitled LASER ASSISTED DEMOLDING OF OPHTHALMIC LENSES, filed Sep. 18, 1992, now U.S. Pat. No. 5,294,379.

BACKGROUND OF THE INVENTION

1. Field of the Invention

The present invention relates generally to a laser demolding apparatus and method, wherein a molded assembly, comprising a front curve, a spaced back curve and a molded contact lens formed therebetween, are separated or demolded in a manner which improves the efficiency of the demolding operation.

More particularly, the subject invention pertains generally to methods and apparatus for producing ophthalmic lenses, and in particular to a method and apparatus for the improved removal of molded ophthalmic lenses from the molds in which they are produced. In particular, this invention is suited to molded ophthalmic lenses such as hydrogen contact lenses, although the method is also applicable to other small, high-precision ophthalmic lenses such as intraocular lenses.

2. Discussion of the Prior Art

As the ophthalmic lens industry has grown, and in particular the industry related to supplying contact lenses that are provided for periodic frequent replacement, the number of contact lenses that need to be produced has increased dramatically. This has required manufacturers to strive for automated methods and apparatus which are adaptable to automated practices and consistent performance.

It is known in the art to make ophthalmic lenses, such as soft contact lenses, by forming a monomer or monomer mixture in a mold such as one made from polystyrene or polypropylene.

Examples of this prior art can be found in U.S. Pat. Nos. 5,039,459, 4,889,664 and 4,565,348. These patents discuss therein the requirement for a polystyrene mold in which the materials, chemistry and processes are controlled such that the mold portions do not require undue force to separate by sticking to the lens or to each other. In contrast to the above polystyrene molds, another example is the use of polypropylene or polyethylene molds such as described in U.S. Pat. No. 4,121,896.

The mold assembly to mold an ophthalmic contact lens typically includes a lower concave mold portion (referred to as a front curve), and an upper convex mold portion (referred to as a back curve). The concave surface of the lower front curve and the convex surface of the upper back curve define therebetween a mold cavity for a contact lens. A particular problem in the prior art is that the front and back mold portions are usually surrounded by a flange, and the monomer or monomer mixture is supplied in excess to the concave mold portion prior to the assembly of the molds. After the mold portions are placed together, defining the lens and forming an edge, the excess monomer or monomer mixture is expelled from the mold cavity and rests on or between the flange of one or both mold portions. Upon polymerization, this excess material forms an annular flange or ring around the formed lens which resists separation of the mold portions during a demolding operation.

The prior art process for separating the mold portions and removing the lens consists of preheating, heating, prying and removal. Hot air provides convective heating, mechanical leverage the prying, and the removal is manual. Heating the mold by convection is not an efficient heat transfer technique, and in the prior art, from the time a mold enters the heating apparatus until the back mold portion is completely removed requires on the order of one minute.

The prior art method for removing the lens is to apply heat to the back mold portion by a heated air stream. The heated air stream is directed against the exterior of the back mold portion where it transfers heat to the upper surface of the lens. Heat is then transported by thermal conduction through the back mold, the molded lens, and the front mold. The heating of the back mold portion is performed in two sequential steps, a preheat stage and a heat/pry stage. In the heat/pry stage the mold is clamped in place, and pry fingers are inserted under the back mold portion. A force is then applied to each back mold portion by the pry fingers during a heating cycle.

When the required temperature has been reached, the back mold portion breaks free and one end thereof is lifted by the pry fingers. After the back mold portion has been detached from the front mold portion on at least one side, the mold exits the heater. The back mold portion and annular flashing are then totally removed.

While the aforementioned method has some efficacy in assisting in the removal of the lens from between the mold portions, the temperature gradient achieved from the heated back mold portion, across the lens to the front mold portion is relatively small. The shortcomings in this approach result from the manner in which heat is delivered to the mold portion. The constant temperature air stream heats the exterior surface of the back mold portion, while thermal conduction transfers heat to the lens surface. The only way to increase the thermal gradient is to transfer heat faster, but this would cause the back mold portion to become too soft for the lift fingers to engage.

This prior art method has not been entirely satisfactory because the induced thermal gradient is not sufficient to fully and repeatedly separate the mold portions.

SUMMARY OF THE INVENTION

Accordingly, it is a primary object of the present invention to provide an improved laser demolding apparatus and method that can easily and repeatedly separate contact lens mold portions without damaging the contact lens formed therebetween.

A further object of the subject invention is the provision of a method and apparatus for separating a back curve mold from a front curve mold of a contact lens mold assembly wherein a substantial temperature gradient is applied across at least one of the mold portions. In a preferred embodiment, a substantial temperature gradient is created between the back curve mold and a contact lens formed in a cavity between the two mold portions.

Another object of the present invention is to provide an automated apparatus to mechanically and reliably pry the mold halves apart in a consistent and reliable manner to thereby enhance the production of defect-free contact lenses, and minimize tearing of the lens and breakage of the lens mold parts.

A further object of the subject invention to perform such separation without excessive environmental heating or waste of energy.

In accordance with the teachings herein, the present invention provides an arrangement for demolding a mold assembly, which includes a first front mold portion having a central mold section with a surrounding flange, and a corresponding second back mold portion also having a central mold section with a surrounding flange. In a preferred embodiment, the first mold portion is a concave front curve mold half, and the second mold portion is a convex back curve mold half, with a contact lens being molded between the first and second mold halves. The flanges of the front and back mold portions are spaced apart and parallel to each other. The demolding apparatus includes restraining means for restraining the first mold portion of the mold assembly, which includes restraining fingers positioned between and on opposite sides of the spaced flanges of the first and second mold portions and against the flange of the first mold portion. The demolding apparatus also includes a separating fixture which includes separating fingers positioned between and on opposite sides of the spaced flanges of the first and second mold portions and against the flange of the second mold portion. During demolding, the separating fixture is rotated relative to the restraining means to progressively separate and peel the second mold portion from the first mold portion.

In greater detail, before demolding, the second mold portion is irradiated with electromagnetic radiation, which is absorbed thereby to cause a substantial temperature gradient between the second mold portion and the contact lens being demolded. The temperature gradient causes a differential expansion and shifting of the surface of the heated second mold portion relative to the surface of the lens to lessen the adhesion therebetween to assist in the separation of the mold portions, while leaving the lens in the first mold portion. The second mold portion is preferably irradiated by a laser producing radiation with a wavelength between 1 $\mu$m and 20 $\mu$m. The separating fingers are joined together to form a U-shaped separator, and the laser beam is directed through the U opening in the U-shaped separator to irradiate the second mold portion.

The mold assembly is carried by a pallet, which carries an array of similar mold assemblies, and a conveyor conveys the pallet into a demolding position in the demolding apparatus. The conveyor conveys the mold assembly on the pallet into the demolding apparatus, to insert the restraining fingers and the separating fingers between the flange members of the mold assembly. The restraining fingers are positioned against the flange of the first mold portion and the separating fingers are positioned against the flange of the second mold portion. The separating fixture is supported by a pivot shaft for rotation relative to the fixedly mounted restraining means, and during the demolding operation the separating fixture is rotated through an angle of approximately 18 degrees. A control system sequentially actuates the conveyor to convey the mold assembly into a demolding position in the demolding apparatus, and then actuates rotation of the separation fixture to sequentially lift and peel the back curve mold portion from the restrained front curve mold portion, to thereby separate the back curve mold portion from the front curve mold portion and the contact lens retained therein.

A plurality of contact lens mold assemblies are carried on a pallet, and the demolding apparatus includes a plurality of pairs of restraining means and separating fixtures. In one preferred embodiment, the pallet carries two rows of contact lens mold assemblies, and the demolding apparatus includes a first set of restraining means and separating fixtures positioned on a first side of the pallet and a second set positioned on a second side of the pallet.

The separating fixture pivot shaft is spaced a distance from the restraining means, and is mounted on a first movable base for elevational movement relative to the fixedly mounted restraining means. The first movable base is pivotally mounted at one end about a rotational shaft, and the separating fixture is mounted at the second, opposite end of the first movable base. The arrangement further includes a ramp cam driven by a pneumatic motor. The first movable base includes a cam follower roller positioned on the ramp cam, such that as the ramp cam is driven by the pneumatic motor, the cam follower roller rotates the first movable base about the rotational shaft to raise and lower the separating fixture. The first movable base is mounted on a second movable base which is mounted for both X and Y translational movements relative to a fixed base. An X pneumatic drive motor drives the second movable base in X translational movement, and a Y pneumatic drive motor drives the second movable base in Y translational movement relative to the fixed base.

The separating fixture includes a gripping means for gripping a second mold portion which is separated from a first mold portion. A back curve mold remover is provided to remove the back curve mold portion from the separating fixture after separation of the mold portions. The separating fixture is translated relative to the back curve remover, during which translation the back curve mold portion is removed from the separating fixture. The back curve remover is vertically movable into and out of a back curve removal position relative to the separating fixture.

The present invention also provides a method for demolding a mold assembly, which includes a first front mold portion having a central mold section with a surrounding flange, and a corresponding second back mold portion having a central mold section with a surrounding flange. A molded ophthalmic lens is formed between the front and back mold portions, and the flanges of the front and back mold portions are spaced apart and parallel to each other. The method comprises restraining the first mold portion of the mold assembly by restraining fingers which are positioned between and on opposite sides of the spaced flanges of the first and second mold portions and against the flange of the first mold portion. Separating fingers are positioned between and on opposite sides of the spaced flanges of the first and second mold portions and against the flange of the second mold portion. The separating fingers are rotated relative to the restrained first mold portion to progressively separate and peel the second mold portion from the first mold portion.

In a preferred embodiment of the method, the second mold portion is irradiated with electromagnetic radiation, which is absorbed thereby to cause a substantial temperature gradient between the second mold portion and the contact lens being demolded. The temperature gradient causes a differential expansion and shifting of the surface of the heated second mold portion relative to the surface of the lens, lessening the adhesion between the lens and the second mold portion to assist in the separation of the mold portions, while leaving the lens in the first mold portion. The second mold portion is preferably irradiated by a laser producing radiation with a wavelength between 1 $\mu$m and 20 $\mu$m. A laser beam is directed through the separating fingers to irradiate the second mold portion.

Pursuant to the method, the mold assembly is carried by a pallet, which carries an array of similar mold assemblies, and the pallet is conveyed into a position wherein the restraining fingers and separating fingers are positioned between the spaced flanges of the first and second mold portions, with the restraining fingers against the flange of the first mold portion and the separating fingers against the flange of the second mold portion. During the demolding operation, the separating fingers are rotated through an angle of approximately 18 degrees. The separating fingers grip a second mold portion which is separated from a first mold portion. The back curve mold portion is removed from the separating fingers after separation of the mold portions. The mold assembly is conveyed to insert the restraining fingers and separating fingers between the flange members of the mold assembly, and then the separating fingers are rotated to sequentially lift and peel the back curve mold portion relative to the front curve mold, thereby separating the back curve mold portion from the front curve mold portion and the contact lens retained therein. A plurality of mold assemblies are carried on the pallet in two rows, and a first set of restraining fingers and separating fingers are positioned on a first side of the pallet, and a second set of restraining fingers and separating fingers are positioned on a second side of said pallet.

BRIEF DESCRIPTION OF THE DRAWINGS

The foregoing objects and advantages of the present invention for a laser demolding apparatus and method may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 1 illustrates a front elevational view of a pallet which holds therein a two by four array of contact lens mold assemblies, each of which consists of a lower front curve mold and an upper back curve mold, defining therebetween a mold cavity for a contact lens;

FIG. 2 is an enlarged side elevational and sectional view of a contact lens mold assembly, illustrating details of construction of a lower front curve mold and an upper back curve mold;

FIG. 3 illustrates a preferred sequence of movements of a separating finger member, mounted on an articulated separating arm, relative to a pallet supporting thereon an array of front and back curve assemblies;

FIG. 4 is a view of a fixture apparatus for separating mold portions according to one aspect of the present invention;

FIG. 5 is a front elevational view of one preferred embodiment of a demolding apparatus pursuant to the present invention;

DETAILED DESCRIPTION OF THE DRAWINGS

Figure 8:
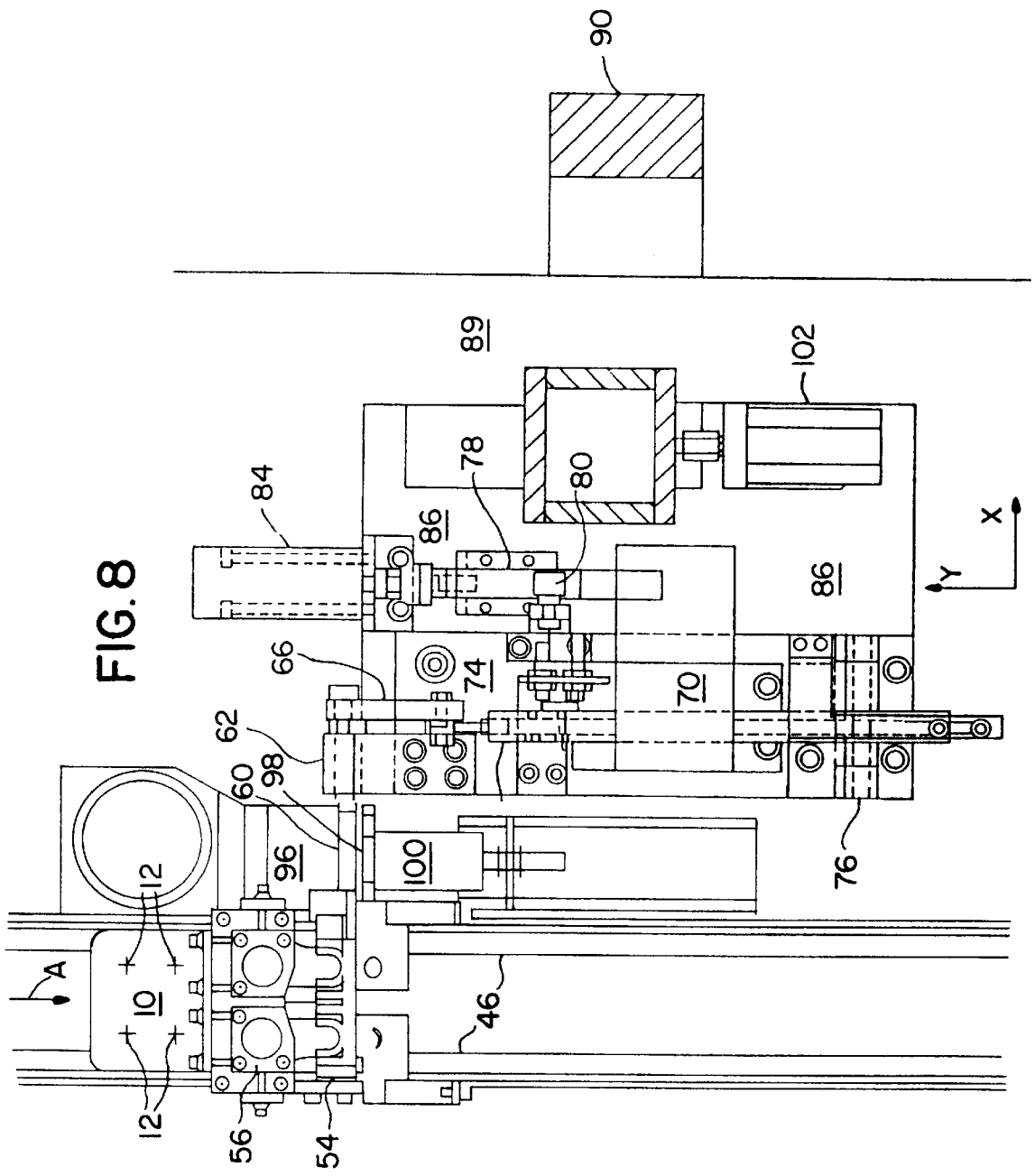
FIG. 8 is a top plan view similar to FIG. 5, illustrating the demolding apparatus positioned adjacent to a conveyor system for the sequential movement of pallets containing contact lens mold assemblies through the demolding apparatus.
Figure 9:
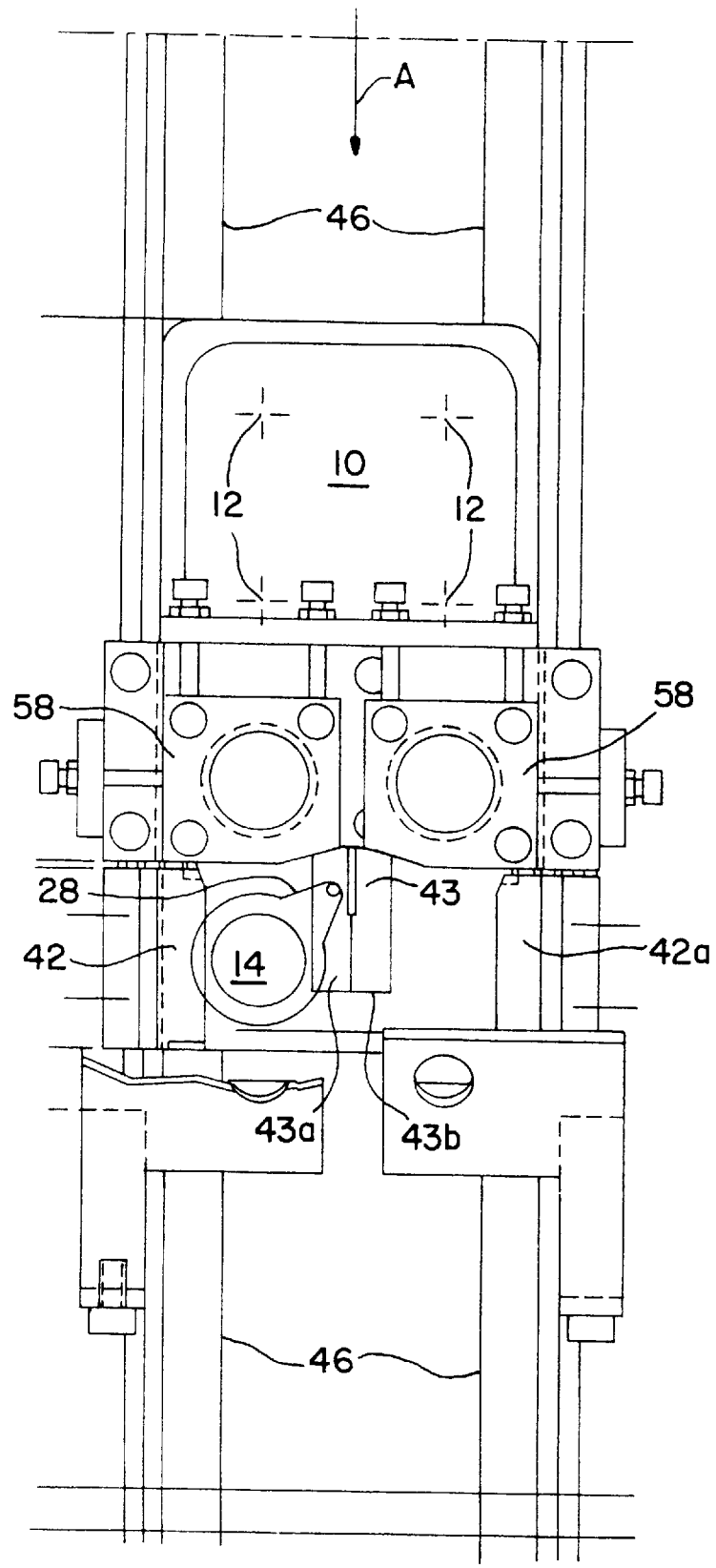
FIG. 9 is a top planar view of the front curve retaining means used in the laser demolding embodiment of the present invention.

Referring to the drawings in detail, FIG. 1 illustrates a front elevational view of a pallet 10 which holds thereon an array, typically a two by four array, of contact lens mold assemblies 12, as illustrated in further detail in FIGS. 8 and 9 wherein each mold assembly is illustrated schematically by a +.

In the laser demolding apparatus, pallets 10 containg contact lens mold assemblies are advanced sequentially in the direction of arrow A, FIGS. 8 and 9, by a conveyor system into and then through the laser demolding apparatus. The pallets 10 are advanced by push blocks on the conveyor system, and are initially incrementally advanced to advance an entire pallet length, and are then incrementally advanced a smaller distance equal to the distance between centers of pairs of mold assemblies carried on the pallet 10. This enables the laser demolding apparatus to demold a pair of mold assemblies after each advance between pairs, and when the last pair is demolded, a new pallet is then advanced into an initial position in the demolding apparatus, as illustrated in FIG. 8.

FIG. 2 is a side elevational and sectional view of one contact lens mold assembly 12 which consists of a lower front curve mold 14 and an upper back curve mold 16, defining therebetween a mold cavity 18 for a contact lens.

The front and back mold halves 14 and 16 are preferably formed of polystyrene but could be any suitable thermoplastic polymer which is sufficiently transparent to ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and have minimal shrinkage during cooling.

The front mold half 14 defines a central curved section with an optical quality concave surface 20, which has a circular circumferential knife edge 22 extending therearound. The knife edge 22 is desirable to form a sharp and uniform plastic radius parting line (edge) for the subsequently molded soft contact lens. A generally parallel convex surface 24 is spaced from the concave surface 20, and an annular essentially uniplanar flange 26 is formed extending radially outwardly from the surfaces 20 and 24. The concave surface 20 has the dimensions of the front curve (power curve) of a contact lens to be produced by the mold assembly, and is sufficiently smooth such that the surface of a contact lens formed by polymerization of a polymerizable composition in contact with the surface is of optically acceptable quality. The front mold half is designed with a thinness, typically 0.8 mm, and rigidity effective to transmit heat therethrough rapidly and to withstand prying forces applied to separate the mold half from the mold assembly during a demolding operation. The front mold half 14 further defines a generally triangular tab 28, FIGS. 2 and 9, integral with the flange 26 which projects from one side of the flange. Tab 28 is essentially uniplanar and extends to an injection hot tip which supplies molten thermoplastic to form the front mold half.

The back mold half 16 defines a central curved section with an optical quality convex surface 32, a generally parallel concave surface 34 spaced from the convex surface 32, and an annular essentially uniplanar flange 36 formed extending radially outwardly from the surfaces 32 and 34. The convex surface 32 has the dimensions of the rear curve (which rests upon the cornea of the eye) of a contact lens to be produced by the back mold half, and is sufficiently smooth such that the surface of a contact lens formed by polymerization of a polymerizable composition in contact with the surface is of optically acceptable quality. The back mold half is designed with a thinness, typically 0.6 mm, and rigidity effective to transmit heat therethrough rapidly and to withstand prying forces applied to separate the mold half from the mold assembly during demolding. The back mold half 16 also defines a generally triangular tab 38, similar to the triangular tab 28, integral with the flange which projects from one side of the flange. The tab 38 extends to an injection hot tip which supplies molten thermoplastic to form the back mold half.

The flanges 26 and 36 are designed to assist in demolding and part handling, and also protect the optical surfaces and the knife edge. The geometry of the triangular tabs 28 and 38 serves an additional function in straightening and orienting the assembled front curve/back curve assembly 12 prior to demolding. When a front mold half or curve 14 is assembled with a back mold half or curve 16, a gap 40 is formed between the two spaced flanges and projecting tabs which is important for demolding. The gap between the tabs is preferably in the range of 1.5 mm–3.0 mm and is required to assist in the demolding operation, as explained in greater detail hereinbelow.

Referring to FIGS. 1 and 2, the contact lens mold assemblies 12 are supported in the pallet 10 with the annular flanges 26 and tabs 28 of the front curve mold 14 recessed slightly below the upper surface of the pallet 10. The annular flanges 36 and tabs 38 of the back curve mold 16 are raised above the upper surface of the pallet, to allow retaining fingers 42 and lifting or prying fingers 44 to slide between the spaced flanges 26, 36 of the front and back curves. The retaining fingers 42 are positioned above opposite sides of the flange 26 around the front curve 14 to restrain the front curve 14 in the pallet and against upward movement. The lifting fingers 44 are positioned below opposite sides of the flange 36 around the back curve 16 to lift and pry the back curve from the restrained front curve.

Referring to FIG. 4, the thin metal pry fingers 44, which are shown positioned underneath the back mold portion flange 36, are machined flat on both sides. The pry fixture 54 rotates about axis 56 so that after exposure of the rear mold portion 16 to the laser, the pry fingers 44 pry the back mold portion up. Whereas it was found that merely prying off the back mold portion in an arbitrary fashion was acceptable, when the metal fingers are stopped under the flange 36, and are then tilted back, the overall quality of the removed lens was as good or better than currently employed techniques. During the demolding separation, the back curve is physically peeled from the front curve and molded contact lens therein, similar to the peeling of a strip of tape from a tape roll, such that the separation occurs sequentially in a wavefront which moves across the back and front curves as they are being separated.

The lens/mold assembly 12 is positioned in a fixture shown in FIG. 4. A primary requirement of this fixture, beyond mechanical stability, is not to interfere with the beam 55 of electromagnetic radiation. The separating fingers 44 of the pry fixture 54 define a U-shaped opening above the back curve mold 16, and prior to demolding, a laser beam is directed through the U-shaped opening 57 to heat the back curve, thus creating a substantial thermal gradient across the mold assembly 12 to assist in separating the back curve from the front curve. For the presently described system, only the back mold portion 16 is heated by exposure to radiation. The back mold portion is thinner than the front mold portion 14, and allows rapid, non-destructive heating of the polystyrene sufficient to create a large thermal gradient. The thicker front mold portion containing a larger amount of polystyrene would not be heated as rapidly, and thereby not produce the same thermal gradient without localized overheating problems.

The side by side assemblies 12 of the front and back curves are held in the pallet 10 with the flanges 26 and tabs 28 of the front curves being in slightly recessed positions and the flanges 36 and tabs 38 of the rear curves 16 being in slightly elevated positions, such that as the pallet 10 travels on an assembly line towards the demolding apparatus, the retaining fingers 42 and separating or lifting fingers 44 readily slide between the separated side flanges 26, 36 of the front and back curves.

FIG. 3 illustrates a preferred sequence of movements of a pry fixture 54, rotationally mounted on a shaft 60, relative to a pallet 10 supporting a two by four array of front and back curve assemblies 12. In a first position in the upper left portion of FIG. 2, the pallet 10, moving on a conveyor, moves the front and back curve assemblies 12 in the pallet into the position illustrated in FIG. 1 in which retaining fingers 46 are positioned above opposite sides of the flange 26 around the front curve 14 to restrain the front curve 14 in the pallet against upward movement. Lifting fingers 48 are positioned below opposite sides of the flange 36 around the back curve mold 16 to lift and pry the back curve mold 16 from the restrained front curve mold 14. As illustrated in FIG. 1, the contact lens mold assemblies 12 are supported in the pallet with the annular flanges 26 and tabs 28 of the front curve mold 14 recessed slightly below the upper surface of the pallet, and with the annular flanges 36 and tabs 38 of the back curve mold 16 raised above the upper surface of the pallet, to allow the retaining fingers 46 and lifting fingers 48 to slide between the spaced flanges 26, 38, as the conveyor moves the pallet into the position shown in FIG. 1.

In the second position in the middle left portion of FIG. 3, after illumination of the back curve by a laser beam, the articulated arm 64 rotates the pry fixture 54 to separate the upper back curve from the lower front curve, with the rotation causing the separating finger member to rotate to pry apart and separate the back curve from the front curve.

In the third position in the lower extreme left portion of FIG. 3, the pry fixture 54 is raised upwardly approximately 10 mm from the pallet.

In the fourth position in the lower middle left portion of FIG. 3, the pallet is moved to the left by the conveyor, the pry fixture is rotated back to its original position, and the pry fixture 54 is conveyed in X and Y directions, as described in further detail hereinbelow, to remove the separated back mold half from the pry fixture 54.

In the fifth position in the lower middle right portion of FIG. 3, another pallet, with unseparated back and front curve assemblies, is moved by the conveyor into a position under the pry fixture, and the pry fixture 54 is conveyed back in X and Y directions into a demolding position, as described in further detail hereinbelow.

In the sixth position in the lower extreme right portion of FIG. 3, the pry fixture 54 is lowered adjacent to the next pallet to reposition the pry fixture 54 relative to the next pallet 10' for the next demolding operation.

The pallet 10' is then conveyed to the left to reassume the first position, in the upper left portion of FIG. 3, in which the separating fingers and retaining fingers are positioned between the spaced opposed flanges of the joined back and front curve assemblies.

Pursuant to the present invention, the back curve lens mold 16 is heated by a laser beam to create a differential expansion of the heated mold polymer relative to the cooler lens polymer, which shifts one surface with respect to the other. The resultant shear force breaks the polymerized lens/polymer mold adhesion and assists in separation of the mold portions 14, 16. The greater the temperature gradient between the surfaces of the mold portions, the greater the shearing force and the easier the mold portions separate. This effect is greatest when there is maximum thermal gradient. As time continues, heat is lost through conduction from the back mold portion into the lens polymer and the front mold portion, and then collectively into the surrounding environment. The heated back mold portion is, therefore, promptly removed so that very little energy is transferred to the polymer lens, avoiding the possibility of thermal decomposition of the lens.

Heating the back curve is accomplished by the use of a source of electromagnetic radiation, preferably a carbon dioxide ($CO_2$) laser, applied to at least one of the mold portions. The laser is preferably of about 80 watts at a wavelength of 10.6 $\mu$m. The exposure of the mold portion to the laser is between one half and one second.

While a $CO_2$ laser producing radiation in the mid-infrared range at a wavelength of 10.6 microns was used in one embodiment, it is also possible to use a high powered UV laser or a high intensity electromagnetic radiation emitter of any type wherein the radiation produced is absorbed by the mold material sufficiently to cause an increase in mold material temperature.

In the case of lasers, both mid-infrared and UV, the laser energy is approximately 60% efficient because the polystyrene mold material is nearly 100% absorptive and only a tiny fraction of the incident radiation is reflected or scattered. In this way, little or no energy is lost to atmospheric absorption, so only the sample is heated.

Also, because of the absorptive nature of the mold material at these frequencies, most of the laser energy is absorbed within several wavelengths travel into the material. From that point, heat is transferred only by conduction from the surface. For that reason, on initial exposure to the laser beam, a substantial thermal gradient is formed between the exposed exterior surface and the surface of the mold portion in contact with the lens.

Preferably, a carbon dioxide ($CO_2$) laser applies radiation to at least one of the mold portions and may be split into two beams to simultaneously heat the back curve of two mold assemblies. It has been found through empirical testing that the laser is preferably of about 80 watts per mold assembly at a wavelength of 10.6 $\mu$m. The exposure time of the mold to the laser is between one half and one second. Lasers of this power range are available both in flowing gas and sealed laser types. In one embodiment of the laser demolding apparatus, a Laser Photonics model 580 cw/pulse laser was utilized.

A preferred embodiment was found by experimentation. While it has been found that a laser power output of 3 to 4 watts is sufficient to cause heating of a polystyrene mold portion so that the mold can be mechanically separated, it was determined that a much higher powered laser, up to 500 watts, is preferred. Increasing the laser power and decreasing the exposure duration was found to increase the thermal gradient and increase the ease and consistency with which the mold portions could be separated.

It was found that if a lens/mold combination were sufficiently underexposed, the separation forces would still be high. Lens damage such as tearing and mold damage such as breaking would result.

If a lens/mold combination were overexposed to the laser energy, separation of the mold portions and removal of the lens would again be difficult. Mold damage would result such as oxidizing and melting (softening), and loss of mold rigidity would frustrate mold separation. In addition, overexposure thermally degrades the lens.

After heating the back mold portion with the laser, a preferred method for removing the back mold portion from the front mold portion is to apply a relative tensile force between the mold portions. It was determined empirically that such mechanical force was best applied less than 0.3 seconds after exposure to the radiation. Although no adverse effects would be contemplated if there was less time between exposure and mechanical removal, in practical terms the time between exposure and mold separation would be between about 0.2 and about 1.5 seconds. Beyond a delay of 1.5 seconds the difficulties in mold separation and lens removal would be the same as those resulting from underexposure, as described above.

A significant quality consideration and advantage of the present invention is the consistent retention of the lens in the front mold portion when the back mold portion is laser heated and removed in accordance with the above technique.

With the optimal exposure time and appropriate demolding mechanism, the mold portions can be separated and the lens removed from the mold in approximately 5 seconds.

The above is, by way of explanation, for the preferred polystyrene mold system, and as can be readily appreciated by one skilled in the art, the radiation wavelengths, power levels, and exposure times must be appropriately adjusted according to the above considerations to achieve optimal characteristics for other lens/mold material systems.

Figure 10:
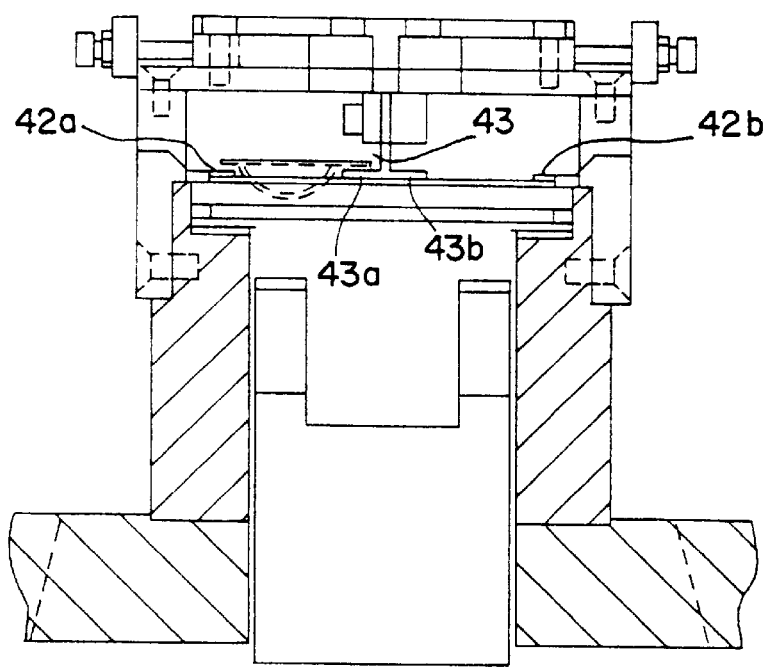
FIG. 10 is a partially cross-sectional view of a portion of the laser demolding embodiment of FIG. 9, further illustrating the front curve retaining guides.

To apply a tensile force between the mold halves, the front curve mold half is held in place as illustrated in FIGS. 9 and 10, wherein a pair of thin metal retaining fingers 42, 43 are fixably mounted above track rails 46 and pallet 10 to secure the front curve mold half 14 in pallet 10 during the prying operation. Retaining finger 43 is an inverted T shaped member and secures one front curve mold half 14 with one flange 43a of the inverted T, and engages a second front curve mold half with a second flange 43b. The second flange 43b cooperates with a further flange 42b to secure the second front curve mold half in position.

As the pallet 10 is sequentially advanced through the laser demolding apparatus, the flanges 42–43 sequentially engage each row of mold assemblies to secure the front curve mold half. The back curve mold half flanges 36 are engaged by a pry fixture 54, diagrammatically illustrated in FIG. 4, which engages both sides of flange 36 as the pallet 10 is advanced into position by the conveyor system. Pallet 10 is then stopped, and a laser beam 55 is directed through the opening 57 between the retaining fingers 42 and the prying fingers 44 against the back mold half 16. The pry fixture 54 is then rotated about axis 56 in the direction of arrow C in FIG. 4 to apply a tensile force to the back curve mold half 16. The upper part of the pry fixture 54 rotates about axis 56 so that after exposure of the back curve mold portion to the laser, the fingers 44 pry the back curve mold portion up. The entire assembly is then lifted approximately 10 mm as indicated by arrows B—B in FIG. 4 to remove the back curve mold part completely. It has been empirically determined that when the metal pry fingers 44 are stopped under the flange, and then tilted back approximately 18°, the overall quality of the lens removed, and the resultant yield was better than currently employed pry techniques which only lift from a single side, and do not control the axis of the pivot point.

It was also empirically determined that the mechanical prying force was best supplied less than 0.3 seconds after exposure to the radiation. Although no adverse effects would be contemplated if there was less time between exposure and mechanical removal, in practical terms the time between exposure and mold separation would be between about 0.2 and about 1.5 seconds.

Figure 6:
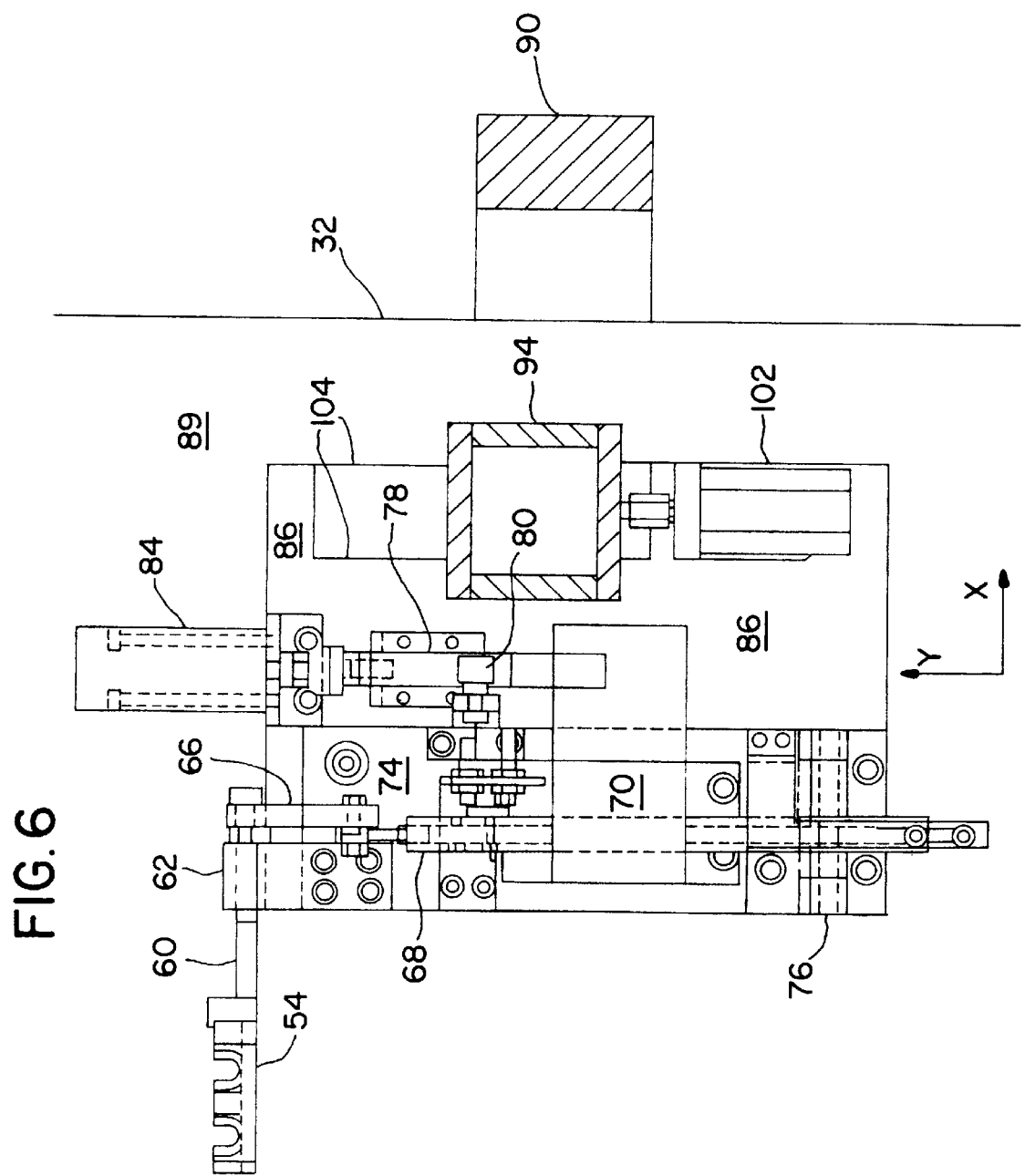
FIG. 6 is a top plan view of the demolding apparatus taken along arrows 6—6 in FIG. 5.
Figure 7:
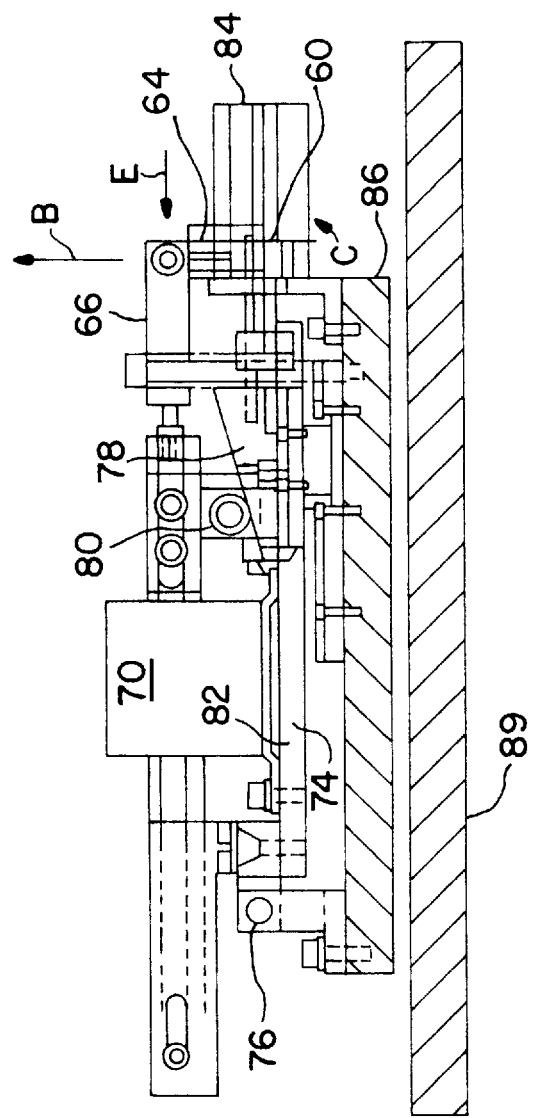
FIG. 7 is a right side elevational view of the demolding apparatus taken along arrows 7—7 in FIG. 5.

A preferred embodiment of the apparatus for demolding the back curve mold halves is more fully illustrated in FIGS. 5, 6, 7, 8, 9 and 10, wherein FIG. 5 is an elevational view of the apparatus, FIG. 6 is a plan view taken along section line 6—6 of FIG. 5, and FIG. 7 is an elevational side view taken along section 7—7 of FIG. 5. FIG. 8 is a top plan view similar to FIG. 5, illustrating the demolding apparatus positioned adjacent to a conveyor system for the sequential movement of pallets containing contact lens mold assemblies through the demolding apparatus. FIG. 9 is a top planar view of the front curve retaining elements, while FIG. 10 is a partially cross-sectional view of a portion of the laser demolding embodiment of FIG. 9, also illustrating the front curve retaining guide elements.

As illustrated in FIG. 9, pallet 10 is on the second of a plurality of demolding cycles wherein a laser delivers intense electromagnetic energy beams 55 directed through laser masks 58 to the second row of mold assemblies in pallet 10. Simultaneously therewith, the first row of mold assemblies is being demolded by the pry fixture 54, as illustrated and described with respect to FIG. 4. Pry fixture 54 is rotated by shaft 60 about axis 56 within journal bearing 62 by a pair of links 64 and 66 which are illustrated in FIGS. 4 and 7. As illustrated in FIG. 7, link 66 is pulled in the direction of arrow E by a rack 68 which is driven by a pinion on a stepper motor 70. Stepper motor 70 thereby rotates shaft 60 in the direction indicated by the arrow C in FIGS. 4 and 7 through approximately 18° of arc to separate the back curve mold half 16 from the front curve mold half 14.

After the pry fixture 54 and shaft 60 have been rotated, the pry fixture 54 is lifted upwardly in the direction of arrows B, FIGS. 4 and 7. The pry fixture 54 is mounted at one end of a platform 74 which pivots about a shaft 76 at the second and opposite end of the platform 74 to raise and lower the pry fixture 54. The platform 74 is pivoted about shaft 76, and is driven in rotation by a slidable cam 78 which engages a roller can follower 80 mounted on the pivotable platform 74. Slidable cam 78 is advanced by a pneumatic drive motor 84 to raise shaft 60 approximately 10 mm so that the attached pry fixture 54 may be retracted for disposal of the back curve mold halves 16 after they have been separated from the mold assembly.

Each of the aforementioned components are mounted on a further movable platform 86 which is translatable in both the X and Y directions, as shown in FIGS. 6 and 8, in order to dispose of the separated back curve mold halves 16, as will be described hereinafter. The demolding apparatus includes a stationary base 89, upon which is mounted a stationary tower 90, relative to which the movable platform 86 is translated in both X and Y directions. Platform 86 is suspended from the stationary tower 90 and is mounted for reciprocal movement along the X axis along an X track 92. Once the pry fixture 54 has separated the back curve mold halves 16, and the pry fixture has been lifted free of pallet 10, platform 86 is shifted to the right along the X axis, as illustrated in FIGS. 6 and 8, by a pneumatic X drive motor 88 to the position 86', shown in phantom in FIG. 5. In the right position of the movable base, illustrated by dashed lines 86' in FIG. 5, the pry fixture 54 is moved to a position adjacent to a back curve scraper 98, FIG. 8, which removes the back curves from the pry fixture 54 and deposits the back curves in a receptacle 96. Platform 86 is shifted to the right in the X direction in order to place the separated back curve mold halves held by the pry fixture 54 over a disposal receptacle 96, FIGS. 5 and 8. Simultaneously, the back curve scraper 98 is elevated by a pneumatic motor 100 to a position parallel with, and just below, the surface of pry fixture 54.

Figure 11:
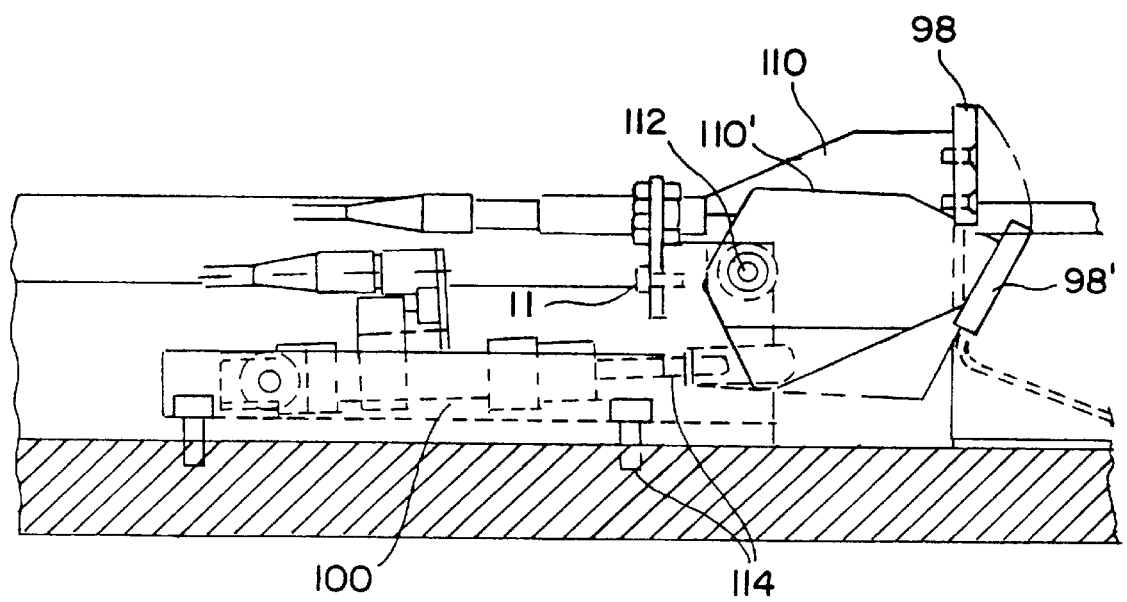
FIG. 11 illustrates a side elevational view of a back curve scraper for removing the back curves and depositing them into a receptacle.

FIG. 11 illustrates the back curve scraper 98 which is secured to a pivotally mounted scraper fixture 110, which rotates about a shaft 112. The scraper fixture 110 is driven by a pneumatic motor 100 and drive shaft 114, to assume one of two positions 98, 110, or 98', 110', as illustrated in FIG. 11. The position 98, 110 illustrated in FIG. 11 places the back curve scraper 98 in an elevated position to remove or scrape the separated back curve molds from the pry fixture 54 as the platform 86 is shifted along the Y axis, in a downward direction as shown in FIG. 8, to scrape the separated mold curves 16 from the pry fixture 54 and cause them to thereby drop into the receptacle 96. Platform 86 is shifted in the Y axis by a pneumatic motor 102 which is fixedly mounted to the platform 86 and the drive shaft of which engages vertical column 94 which extends downwardly from track 92 on stationary tower 90. Platform 86 has a Y track 104 mounted thereon, as illustrated best in FIGS. 5 and 6, such that the platform 86 and track 104 can translate along the Y axis relative to vertical column 94.

After removal of the separated mold curves 16 from the pry fixture 54, platform 86 is then reciprocated back along the Y axes, upwardly as illustrated in FIG. 8, and then back along the X axes, to the left as illustrated in FIG. 8, to its original position, as illustrated in FIGS. 5 and 8. The slidable cam 78 is then withdrawn by drive motor 84 and the pry fixture 54 is lowered into a demolding position above pallet 10, ready for the next demolding operation. The laser is then energized to heat the second row of mold assemblies in pallet 10, and pallet 10 is then incrementally advanced by the conveyor to place the heated second row of mold assemblies into a demold position. Pallet 10 is constrained through the demolding apparatus on the conveyor by rails 46 which prevent vertical movement and any pitch, yaw or roll of the pallet during the demolding operation.

The pneumatic drive motors 88 and 102 basically drive the movable base 86 in an L path back and forth between end stop positions, and end stop detectors are employed to sense the end positions and deactivate the motors. One leg of the L translates the pry fixture 54 in an X direction between the position illustrated in FIG. 5 and the position 86' at which the pry fixture 54 is positioned adjacent to the back curve scraper 98. The second leg of the L translates the pry fixture 54 in a Y direction as illustrated in FIG. 8 to translate the pry fixture 54, and the rear curve members supported thereby after demolding, by the back curve scrapers 98 which remove the rear curve members from the pry fingers 44, and the back curve members then fall into a back curve disposal receptacle 96.

While several embodiments and variations of the present invention for a laser demolding apparatus and method are described in detail herein, it should be apparent that the disclosure and teachings of the present invention will suggest many alternative designs to those skilled in the art.

What is claimed is:

1. A method for demolding a mold assembly, comprising a first front mold portion which has a central mold section with a surrounding flange, and a corresponding second back mold portion which has a central mold section with a surrounding flange, and having a molded ophthalmic lens formed between the front and back mold portions, and wherein the flanges of the front and back mold portions are spaced apart relative to each other, comprising:
   a. restraining the first mold portion of the mold assembly by restraining fingers which are positioned between and on opposite sides of the spaced flanges of the first and second mold portions and against the flange of the first mold portion;
   b. positioning separating fingers between and on opposite sides of the spaced flanges of the first and second mold portions and against the flange of the second mold portion; and
   c. rotating the separating fingers about a fixed axis relative to the restrained first mold portion to progressively separate and peel the second mold portion from the molded ophthalmic lens in the first mold portion.

2. A method as claimed in claim 1, including heating the second mold portion with electromagnetic radiation, which is absorbed by the second mold portion to cause a substantial temperature gradient between the second mold portion and the contact lens being demolded, with the temperature gradient causing a differential expansion and shifting of the surface of the heated second mold portion relative to the surface of the lens, lessening the adhesion between the lens and the second mold portion to assist in the separation of the mold portions, while leaving the lens in the first mold portion.

3. A method as claimed in claim 2, wherein the heating step utilizes a laser producing electromagnetic radiation having a wavelength between 1 μm and 20 μm.

4. A method as claimed in claim 1, including carrying the mold assembly in a pallet, which carries an array of mold assemblies, and conveying the pallet into a position wherein the restraining fingers and separating fingers are positioned between the spaced flanges of the first and second mold portions, with the restraining fingers against the flange of the first mold portion and the separating fingers against the flange of the second mold portion.

5. A method as claimed in claim 1, wherein during the demolding operation the separating fingers are rotated through an angle of approximately 18 degrees.

6. A method as claimed in claim 1, wherein said separating fingers grip a second mold portion which is separated from a first mold portion.

7. A method as claimed in claim 6, further including removing the second mold portion from said separating fingers after separation of the mold portions.

8. A method as claimed in claim 1, wherein the first mold portion is a concave front curve mold half and the second mold portion is a convex back curve mold half, with a contact lens molded between the first and second mold halves.

9. A method as claimed in claim 1, further including directing a laser beam through the separating fingers to heat the second mold portion.

10. A method as claimed in claim 1, including conveying the mold assembly to insert the restraining fingers and separating fingers between the flange members of the mold assembly as a consequence of said conveyance, and then rotating the separating fingers through an arc of approximately 18 degrees to sequentially lift and peel the back curve mold portion relative to the front curve mold portion to thereby separate the back curve mold portion from the front curve mold portion and the contact lens therein.

11. A method as claimed in claim 10, including carrying a plurality of mold assemblies on a pallet during said conveying step.

12. A method as claimed in claim 11, wherein said pallet contains two rows of contact lenses and mold assemblies, and positioning a first set of restraining fingers and separating fingers on a first side of said pallet, and positioning a second set of restraining fingers and separating fingers on a second side of said pallet.

* * * * *